(12) United States Patent
Boudou et al.

(10) Patent No.: US 7,562,676 B2
(45) Date of Patent: Jul. 21, 2009

(54) DOUBLE-GUIDED PRESSURIZED FLUID DISTRIBUTOR

(75) Inventors: Jean-Luc Boudou, Saint Andre de Corcy (FR); Vincent Ligneau, Mions (FR)

(73) Assignee: Bosch Rexroth D.S.I., Venissieux (FR)

( * ) Notice: Subject to any disclaimer, the term of this patent is extended or adjusted under 35 U.S.C. 154(b) by 358 days.

(21) Appl. No.: 10/554,460

(22) PCT Filed: Mar. 4, 2004

(86) PCT No.: PCT/FR2004/000511
§ 371 (c)(1),
(2), (4) Date: Nov. 14, 2005

(87) PCT Pub. No.: WO2004/099627
PCT Pub. Date: Nov. 18, 2004

(65) Prior Publication Data
US 2006/0118187 A1    Jun. 8, 2006

(30) Foreign Application Priority Data
May 5, 2003   (FR) .................................. 03 05459

(51) Int. Cl.
*F15B 13/06* (2006.01)
(52) U.S. Cl. ................................. 137/636.1; 137/636.2

(58) Field of Classification Search .............. 137/636.1, 137/636.2
See application file for complete search history.

(56) References Cited

U.S. PATENT DOCUMENTS

| 4,184,512 | A  |   | 1/1980 | Pignolet |          |
|-----------|----|---|--------|----------|----------|
| 5,638,866 | A  | * | 6/1997 | Mueller  | 137/636.2 |
| 6,932,113 | B1 | * | 8/2005 | Kauss    | 137/636.2 |

FOREIGN PATENT DOCUMENTS

| EP | 0 364 603 A1 | 4/1990 |
| FR | 2 056 464 A  | 5/1971 |
| FR | 2 376 978    | 7/1978 |
| FR | 2 507 732 A  | 12/1982 |

* cited by examiner

*Primary Examiner*—Kevin L Lee
(74) *Attorney, Agent, or Firm*—Oliff & Berridge, PLC

(57) ABSTRACT

The invention relates to a fluid distributor for a heavy-construction machine, comprising a body and a pressure-reducing means which is mounted in said body and comprises a pushrod arranged in a cavity of the body, a plunger being mounted in an oscillating manner. At least one guide in which the pushrod is displaced is immobilized in the cavity, a first seal and a second seal respectively ensuring the hydraulic sealing inside and outside the guide. Said guide comprises at least part of the upper guide and part of the lower guide which are nested inside each other and mutually define a recess facing the pushrod, the first seal being trapped in the recess.

20 Claims, 3 Drawing Sheets

DOUBLE-GUIDED PRESSURIZED FLUID DISTRIBUTOR

BACKGROUND OF THE INVENTION

The subject of the present invention is a pressurized fluid distributor, particularly a manipulator for a construction machine. These distributors are mainly used for controlling various hydraulic functions such as the movement of various receiving members installed on board these construction machines.

DESCRIPTION OF THE PRIOR ART

Such hydraulic distribution devices are well known to those skilled in the art and are described for example in documents FR-2 507 732, or FR-2 376 978.

The pressurized fluid distributors of the type described in the aforementioned documents comprise:
- a body that comprises at least one cavity of which one end is open onto at least one upper face of the body,
- at least one pressure reducer which is mounted in the body, and which comprises a pushrod which is housed with to-and-fro movement in said at least one cavity of the body in an axial direction, and a plunger which is mounted so as to oscillate substantially in the same axial direction to perform the function of pressure reducer, and a regulating spring interposed between the plunger and the pushrod, the balance of the plunger depending on the compression of the spring imposed by the downward movement of the pushrod and the output regulating pressure to be delivered to a receiving member downstream,
- a handle that is mounted so as to tilt relative to the body, opposite the upper face of said body to control the to-and-fro movement of said at least one pushrod,
- at least one guide in which the pushrod moves and which is immobilized in the cavity, at the open end, and
- at least one first seal and one second seal which respectively provide the hydraulic seal inside and outside the guide.

For a good quality seal to be obtained, it is necessary to take great care with the mounting of the first and second seals on the guide. Specifically, the guides currently encountered have grooves that are machined on their outer surface and on their inner surface, and in which the seals are intended to be inserted. These grooves must be capable of not harming the seals during mounting. This therefore requires a good control of the machining and of the dimensions obtained, which generates high costs.

SUMMARY OF THE INVENTION

The object of the present invention is to remedy the aforementioned disadvantages by providing a fluid distributor whose guide is obtained at low cost, and in which the mounting of the seals is simplified. As a result, according to the invention, a fluid distributor of the aforementioned type is essentially characterized in that the guide comprises at least one upper guide portion and one lower guide portion which are nested one on the other, in that said upper guide portion and lower guide portion mutually delimit a housing turned toward the pushrod, and in that the first seal is captive in the housing.

Thus, thanks to these arrangements, the fluid distributor has a guide made in two portions so that the guide portions and the seals are mounted by successive stacking. Thus, the risks of damaging the seals during mounting are much reduced.

Preferably, the distributor comprises immobilization means which are fitted onto the body, at the upper face of said body, for locking at least the upper guide portion in position.

Again preferably, the immobilization means comprise a retention flange attached to the upper face of the body.

Advantageously, the upper guide portion and lower guide portion also mutually delimit a housing turned toward the body and in which the second seal is captive.

Again advantageously, the upper guide portion is made of the same material as the retention flange.

As a variant, the body is formed in two superposed sections along a parting line: an upper section in which the pushrod is movably mounted and a lower section in which the major portion of the plunger is mounted so as to oscillate, the upper guide portion being made of the same material as the upper section of the body.

Advantageously, the retention flange and the upper portion of the body are made together of the same material.

Preferably, the second seal is interposed between the upper section and lower section of the body at their parting line.

Preferably, at least the lower guide portion is made of one of the materials chosen from plastic, an injected alloy, a sintered material, and a machined material.

BRIEF DESCRIPTION OF THE DRAWINGS

Other features and advantages of the invention will become apparent during the following description of three of its embodiments, given as nonlimiting examples, with reference to the appended drawings in which.

DESCRIPTION OF THE PREFERRED EMBODIMENTS

Figure 1:
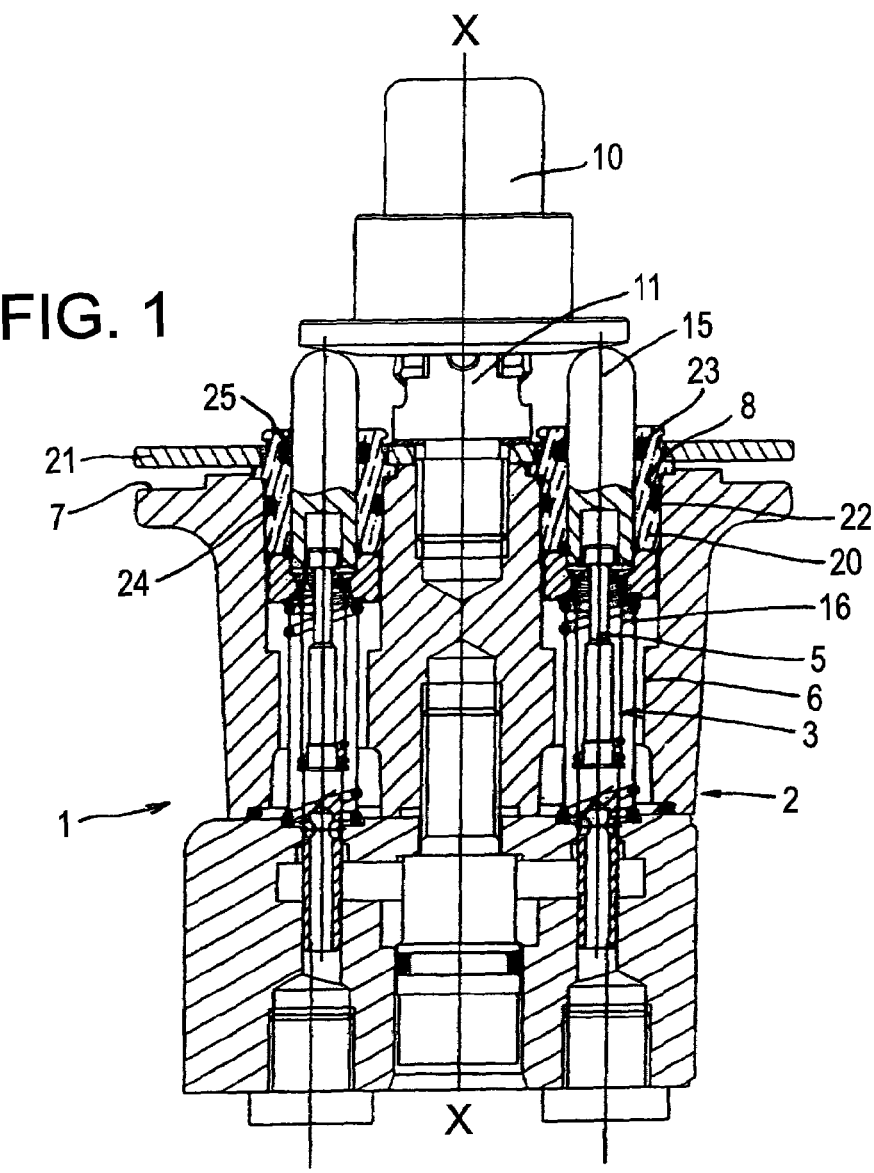
FIG. 1 is a view in longitudinal section of a fluid distributor according to the prior art.

The pressurized fluid distributor 1 represented in FIG. 1 is a distributor belonging to the prior art. The fluid delivered by this distributor is intended to supply a downstream receiving member not shown, at a pressure that is appropriate to the use of that member.

As is well understood by those skilled in the art, the fluid distributor 1 comprises a body 2 in which are mounted at least one and preferably several pressure reducers 3. Even though only two reducers are shown in FIG. 1, these distributors are usually fitted with four pressure reducers that are identical to one another. These reducers are usually parallel with one another and are oriented along the longitudinal axis X-X of the distributor 1.

Each pressure reducer 3 comprises a plunger 5 that is mounted so as to oscillate substantially in an axial direction parallel to the axis X-X, and which moves in a cavity 6 arranged in the body 2 of the distributor 1. This cavity 6 has one end 8 open at an upper face 7 of the body 2.

The adjustment of the pressure reducer 3 is controlled by an operator by means of a handle 10 (partially shown in FIG. 1). This handle 10 is mounted so as to tilt on the body 2, opposite the upper face 7 of this body. An articulation 11, for example of the universal joint type, is used to fixedly attach the handle 10 to the body 2. As a variant, this articulation is for example a spherical articulation or else a pivoting connection.

The pressure reducer 3 comprises, again in a manner known per se, a pushrod 15 and a regulating spring 16. The regulating spring is interposed between the plunger 5 and the pushrod 15 so that the balance of the plunger 5 depends on the compression of the spring 16 imposed by the downward movement of the pushrod 16 and the output regulating pressure to be delivered to the receiving member (not shown).

The downward movement of the pushrod 15 is controlled by the handle 10 so that it has a to-and-fro movement inside the upper end 8 of the cavity 9.

The operation of such a fluid distributor is well known to those skilled in the art and is for example described in the aforementioned documents.

As is again well known, the guidance in translation of the pushrod 15 is provided by means of a guide 20 which takes the form of a single-piece sleeve immobilized at the open end 8 of the cavity 6 by means of a blanking plate 21. Two peripheral grooves 22 and 23 have been machined in the guide 20, respectively at the outer surface and the inner surface of this guide.

In the outer peripheral groove 22, an O-ring 24 has been immobilized to provide the seal between the guide 20 and the body 2 while a lip seal 25 is immobilized in the groove 23 to provide the seal between the pushrod 15 and the guide 20.

Such a distributor has the disadvantage of requiring very good machining of the outer and inner peripheral grooves of the guide 20 so that the O-ring 24 and the lip seal 25 are not damaged when they are mounted on the guide. This requires good control of the dimensions and the quality of the surface obtained, generating a high cost.

By contrast, according to the present invention, the seal of the pushrod guide is obtained more simply and hence at lower cost. The distributor according to the present invention shown in FIGS. 2 to 6 comprises the same constituent parts as those previously described with relation to the pressure regulating function. The identical constituent parts bear the same reference numbers. Hereinafter, all that will be described will be the constituent parts of the pressure distributor according to the present invention that are used to guide the pushrod 15.

According to an essential feature of the present invention, the pushrod 15 moves in a to-and-fro movement inside a guide 30 that is immobilized at the open end 8 of the cavity 6 of the body 2 and that is made in two portions distinct from one another.

The guide 30 thus comprises an upper guide portion 31 and a lower guide portion 32 which are nested in one another. More particularly, the two portions 31 and 32 are nested along the axis X-X so that one of the portions penetrates into the other while mutually delimiting internally a first housing 33 which opens internally, in the direction of the pushrod 15. Likewise, the interpenetration of the upper portion 31 with the lower portion 32 of the guide 30 delimits externally a second housing 34, which is turned in the opposite direction to the first housing 33, opening in the direction of the body 2.

Figure 3:
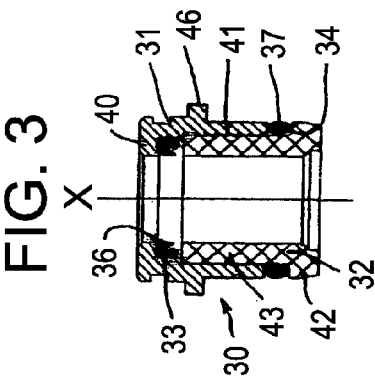
FIG. 3 is a view in longitudinal section of the guide fitted to the distributor of FIG. 2.

As is shown more particularly in FIG. 3, the upper portion 31 has a head 40 and a body 41, the internal diameter of the head 40 being smaller than that of the body 41. The lower portion 32 of the guide 30 has a foot 42 and a core 43, the outer diameter of the foot 42 being greater than that of the core 43. The shape of the core 43 and the shape of the body 41 are complementary so that the core 43 can be sleeve-coupled inside the body 41, their respective length being suitable for delimiting the inner housing 33 and the outer housing 34.

The lower portion 31 and the upper portion 32 of the guide 30 are of generally cylindrical shape whose internal diameter is substantially equal to the diameter of the pushrod 15.

Thus it is understood that the lower and upper portions of the guide have simple shoulders formed by a change of diameter, so that no groove is machined for inserting the first seal 36 and the second seal 37 which respectively provide the inner and outer seal of the guide 30 against the pushrod 15 and the body 2.

The fluid distributor 1 also comprises immobilization means 45 that are fitted onto the body 2, at the upper face 7 of this body to lock the lower guide portion 32 in position while resting against a collar 46 belonging to the upper guide portion 31.

The immobilization means 45 take for example the form of a retention flange screwed onto the upper face 7 of this body 2.

Prior to the immobilization of the guide 30 in the cavity 6 of the body 2, the lower portion 32 of the guide 30, the second seal 37, and the upper portion 31 of the guide 30 are simply stacked, the first seal 36 having been previously positioned inside the shoulder of this upper portion. The assembly is then immobilized by means of the flange 45 inside the cavity 6.

The guide according to the present invention is thus obtained without risking damaging the two seals, and while minimizing the machining costs.

Figure 4:
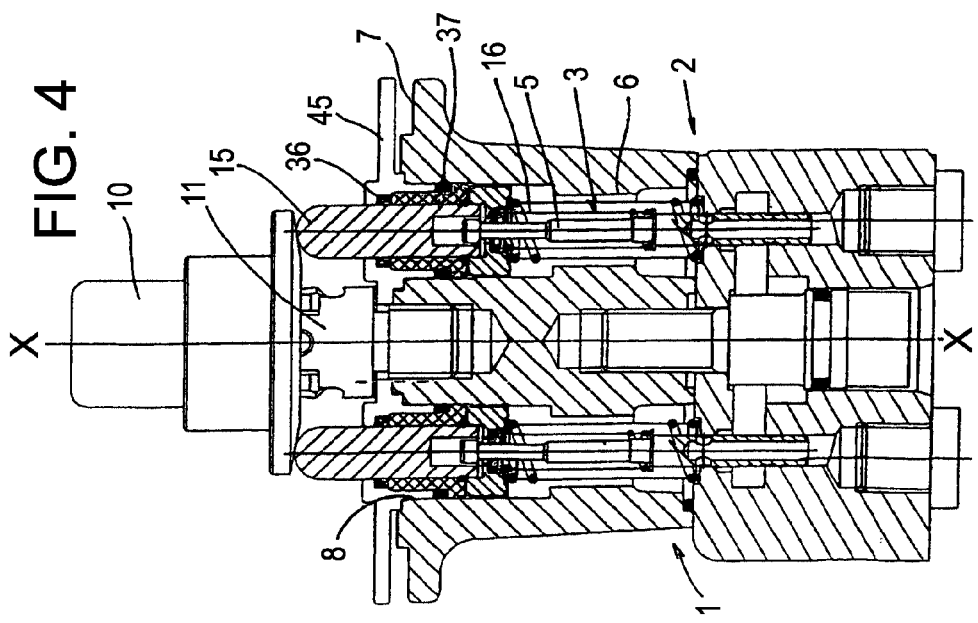
FIGS. 4 and 5 are respectively views, similar to those of FIG. 2, of a second embodiment and of a third embodiment of a distributor according to the present invention.

In the second embodiment of the guide 30 shown in FIG. 4, the upper portion 31 of the guide 30 is made of the same material as the flange 45. This minimizes the number of constituent parts providing the guidance of the pushrod 15 because, during the assembly, the upper portion of the guide is fixedly attached to the flange 45. As previously, the outer seal 37 is placed against the shoulder of the lower portion 32 of the guide 30 while the inner seal 36 is placed inside the shoulder supported by the retention flange 45, the lower portion 32 then being nested into the flange 45.

Figure 6:
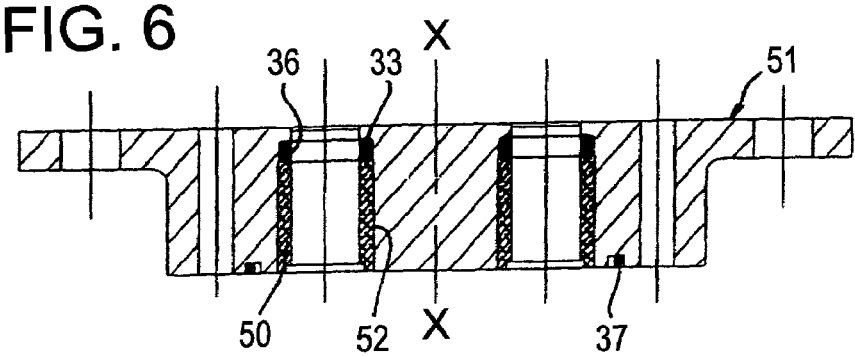
FIG. 6 is a view in longitudinal section of the upper section of the body of the distributor represented in FIG. 5.
Figure 2:
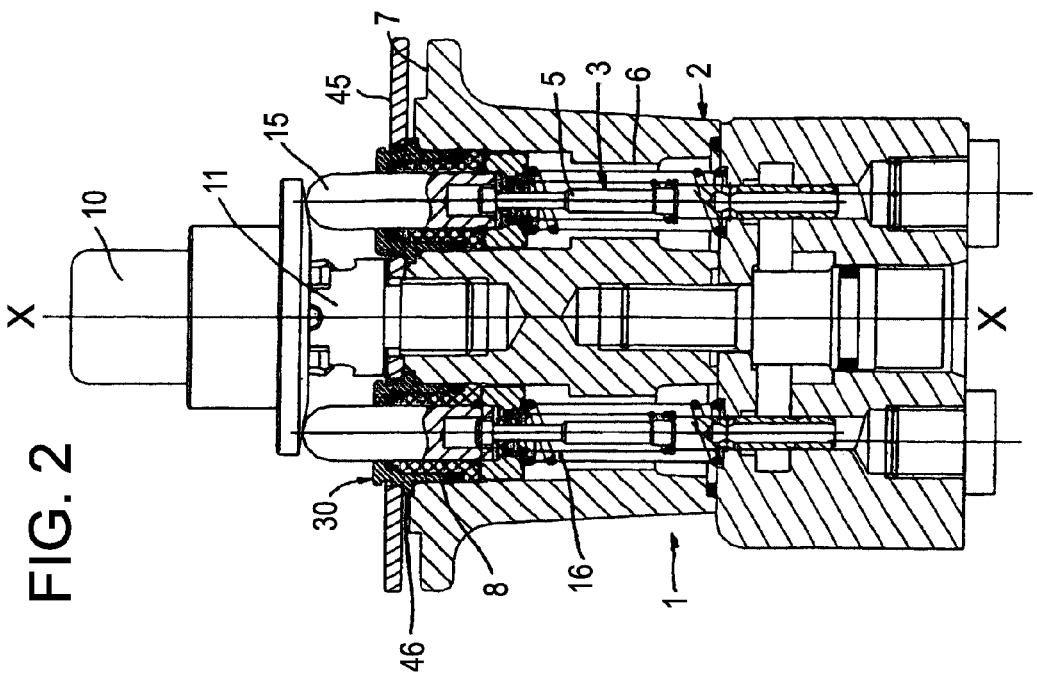
FIG. 2 is a view in longitudinal section of a fluid distributor according to a first embodiment of the present invention.
Figure 5:
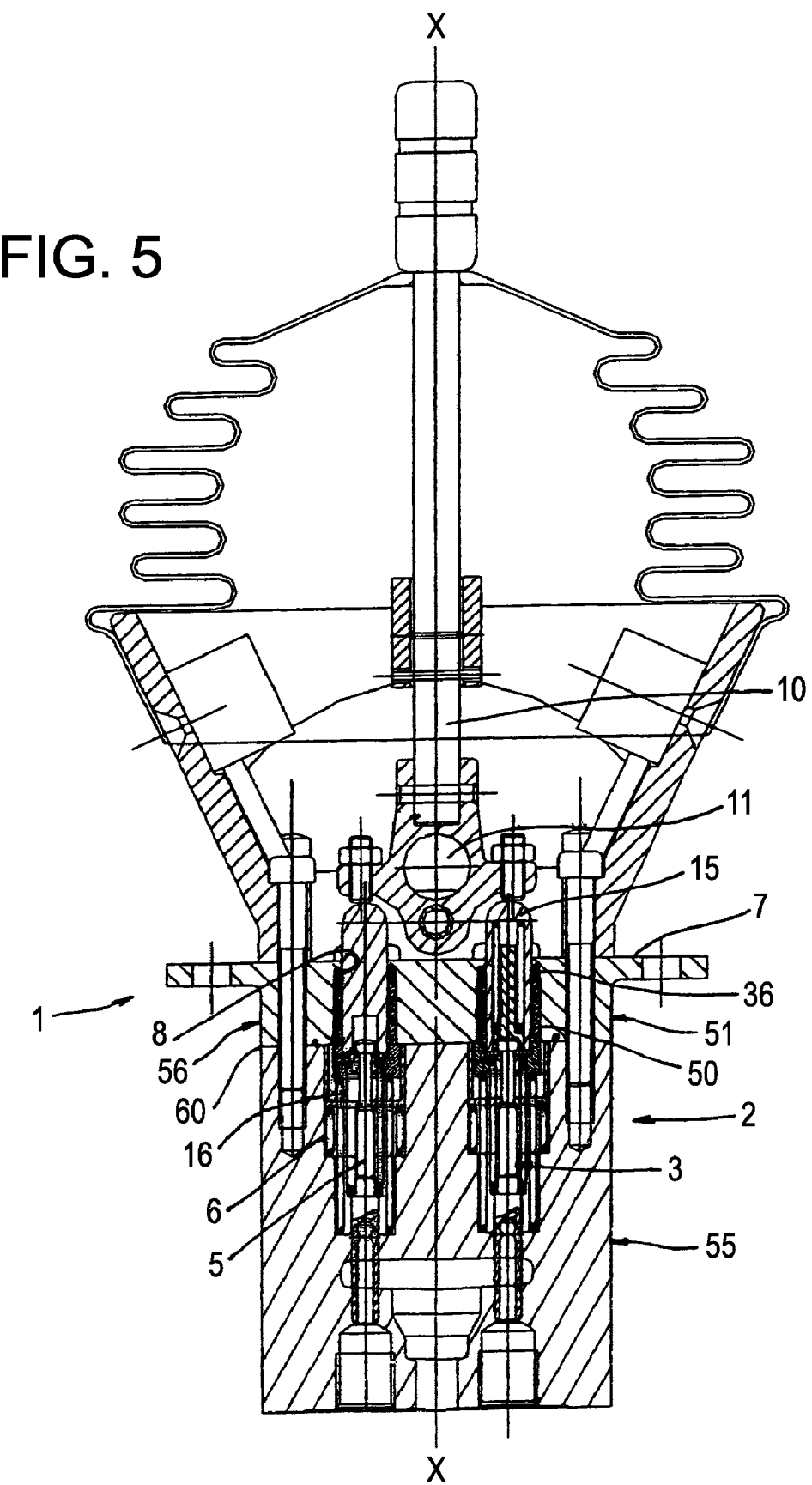

In a third embodiment of the guide shown in FIGS. 5 and 6, the guide 30 consists of a single portion 50 of generally cylindrical shape. The retention flange 51 is much thicker than the flange 45 of the previous embodiments, so that the lower portion 50 of the guide 30 is entirely housed inside the retention flange 51. The guide portion 50 is housed inside a bore 52 which has a diameter reduction in order to house the inner seal 36 between the diameter reduction of the bore 52 and the end of the guide portion 50.

In addition, in order to make it easier to machine the inner portions of the body 2, this body 2 is formed of two superposed sections 55 and 56 that are in contact along a parting line 60. The pushrod 15 is mounted movably inside the upper portion 56 while the major portion of the plunger 5 is mounted so as to oscillate inside the lower section 55. The retention flange 51 is in the present case made of the same material as the upper portion 56 of the body 2. The number of constituent parts necessary for the guidance is thereby further reduced.

It goes without saying that the invention is not limited to the embodiments described hereinabove as nonlimiting examples; on the contrary, it embraces all the variant embodiments in the context of the following claims.

The invention claimed is:

1. A pressurized fluid distributor, comprising:
    a body that comprises at least one cavity of which one end is open onto at least one upper face of the body,
    at least one pressure reducer which is mounted in the body, and which comprises a pushrod which is housed with to-and-fro movement in said at least one cavity of the body in an axial direction, and a plunger which is mounted so as to oscillate substantially in the same axial direction to act as a pressure reducer, and a regulating spring interposed between the plunger and the pushrod, the balance of the plunger depending on the compression of the spring imposed by the downward movement of the pushrod and the output regulating pressure to be delivered to a receiving member downstream, a handle that is mounted so as to tilt relative to the body, opposite the upper face of said body to control the to-and-fro movement of said at least one pushrod, at least one guide in which the pushrod moves and which is immobilized in the cavity, at the open end, and at least one first seal and one second seal which respectively provide liquid sealing inside and outside the guide, wherein the guide comprises at least one upper guide portion and one lower guide portion which are nested one on the other, wherein said upper guide portion and lower guide portion mutually delimit a housing turned toward the pushrod, wherein said upper guide portion and lower guide portion also mutually delimit a housing turned toward the body and in which the second seal is captive, and wherein the first seal is captive in the housing.

2. The fluid distributor of claim 1 further comprising immobilization means which are fitted onto the body, at the upper face of said body, for locking at least the upper guide portion in position.

3. The fluid distributor of claim 2, wherein the immobilization means comprise a retention flange attached to the upper face of the body.

4. The fluid distributor of claim 3, wherein the upper guide portion is made of the same material as the retention flange.

5. The fluid distributor of claim 3, wherein the body is formed in two superposed sections along a parting line: an upper section in which the pushrod is movably mounted and a lower section in which a majority of the plunger is mounted so as to oscillate, the upper guide portion being made of the same material as the upper section of the body.

6. The fluid distributor of claim 5, wherein the retention flange and the upper guide portion of the body are made together of the same material.

7. The fluid distributor of claim 5, wherein the second seal is interposed between the upper section and lower section of the body at the parting line.

8. The fluid distributor of claim 1, wherein at least the lower guide portion is made from plastic, injected alloy, sintered material, or other machined material.

9. The fluid distributor of claim 6, wherein the second seal is interposed between the upper section and lower section of the body at the parting line.

10. The fluid distributor of claim 2, wherein at least the lower guide portion is made from plastic, injected alloy, sintered material, or other machined material.

11. The fluid distributor of claim 3, wherein at least the lower guide portion is made from plastic, injected alloy, sintered material, or other machined material.

12. The fluid distributor of claim 4, wherein at least the lower guide portion is made from plastic, injected alloy, sintered material, or other machined material.

13. The fluid distributor of claim 5, wherein at least the lower guide portion is made from plastic, injected alloy, sintered material, or other machined material.

14. The fluid distributor of claim 6, wherein at least the lower guide portion is made from plastic, injected alloy, sintered material, or other machined material.

15. The fluid distributor of claim 7, wherein at least the lower guide portion is made from plastic, injected alloy, sintered material, or other machined material.

16. A manipulator for a construction machine that includes the pressurized fluid distributor with the guide of claim 1, wherein said guide is cylindrical in shape.

17. A pressurized fluid distributor, comprising:

a body that comprises at least one cavity of which one end is open onto at least one upper face of the body, at least one pressure reducer which is mounted in the body, and which comprises a pushrod which is housed with to-and-fro movement in said at least one cavity of the body in an axial direction, and a plunger which is mounted so as to oscillate substantially in the same axial direction to act as a pressure reducer, and a regulating spring interposed between the plunger and the pushrod, the balance of the plunger depending on the compression of the spring imposed by the downward movement of the pushrod and the output regulating pressure to be delivered to a receiving member downstream, a handle that is mounted so as to tilt relative to the body, opposite the upper face of said body to control the to-and-fro movement of said at least one pushrod, at least one guide in which the pushrod moves and which is immobilized in the cavity, at the open end, and at least one first seal and one second seal which respectively provide liquid sealing inside and outside the guide, wherein the guide comprises at least one upper guide portion and one lower guide portion which are nested one on the other, wherein said upper guide portion and lower guide portion mutually delimit a housing turned toward the pushrod, wherein the body is formed in two superposed sections along a parting line: an upper section in which the pushrod is movably mounted and a lower section in which a majority of the plunger is mounted so as to oscillate, the upper guide portion being made of the same material as the upper section of the body, and wherein the first seal is captive in the housing, immobilization means which are fitted onto the body, at the upper face of said body, for locking at least the upper guide portion in position, wherein the immobilization means comprise a retention flange attached to the upper face of the body.

18. The fluid distributor of claim 17, wherein the retention flange and the upper guide portion of the body are made together of the same material.

19. The fluid distributor of claim 17, wherein the second seal is interposed between the upper section and lower section of the body at the parting line.

20. The fluid distributor as claimed in claim 17, wherein at least the lower guide portion is made from plastic, injected alloy, sintered material, or other machined material.

* * * * *